United States Patent
Sato

(10) Patent No.: US 12,063,610 B2
(45) Date of Patent: Aug. 13, 2024

(54) NETWORK SYNCHRONIZATION SYSTEM AND SYNCHRONIZATION METHOD FOR NETWORK SYSTEM

(71) Applicant: NEC Corporation, Tokyo (JP)

(72) Inventor: Tomoaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 17/826,417

(22) Filed: May 27, 2022

(65) Prior Publication Data

US 2022/0394643 A1    Dec. 8, 2022

(30) Foreign Application Priority Data

Jun. 4, 2021   (JP) .................................. 2021-094087

(51) Int. Cl.
*H04W 56/00*      (2009.01)
(52) U.S. Cl.
CPC ................................. *H04W 56/002* (2013.01)
(58) Field of Classification Search
CPC .................................................. H04W 56/002
See application file for complete search history.

(56) References Cited

U.S. PATENT DOCUMENTS

| | | | | |
|---|---|---|---|---|
| 2011/0116457 A1* | 5/2011 | Damnjanovic | ....... | H04L 1/1854 370/329 |
| 2012/0071199 A1* | 3/2012 | Yamazaki | ............. | H04B 7/024 455/524 |
| 2016/0044616 A1* | 2/2016 | Lee | ................... | H04W 56/0095 370/350 |
| 2017/0016575 A1* | 1/2017 | Lamiable | ................ | F17C 13/04 |
| 2023/0246766 A1* | 8/2023 | Dutta | .................... | H04L 5/0035 370/315 |

FOREIGN PATENT DOCUMENTS

| JP | 2009-235568 A | 10/2009 |
|---|---|---|
| JP | 2013-093730 A | 5/2013 |

OTHER PUBLICATIONS

ITU-T G.8271/Y.1366 (Mar. 2020), Recommendation, Time and phase synchronization aspects of telecommunication networks, the Internet <https://www.itu.int/rec/T-REC-G.8271-202003-I>.
ITU-T G.8260 (Mar. 2020), Recommendation, Definitions and terminology for synchronization in packet networks, the Internet <https://www.itu.int/rec/T-REC-G.8260-202003-I>.

* cited by examiner

*Primary Examiner* — Stephen J Clawson

(57) ABSTRACT

Provided are a network synchronization system and a synchronization method for a network system that achieve network synchronization for a network between geographically apart points. The network synchronization system includes a first communication device positioned at a first point, a second communication device positioned at a second point being different from the first point, and a third communication device configured to communicate with the first communication device and the second communication device, and receive synchronization information relating to the first communication device from the first communication device, and then transmit the synchronization information relating to the first communication device to the second communication device.

9 Claims, 11 Drawing Sheets

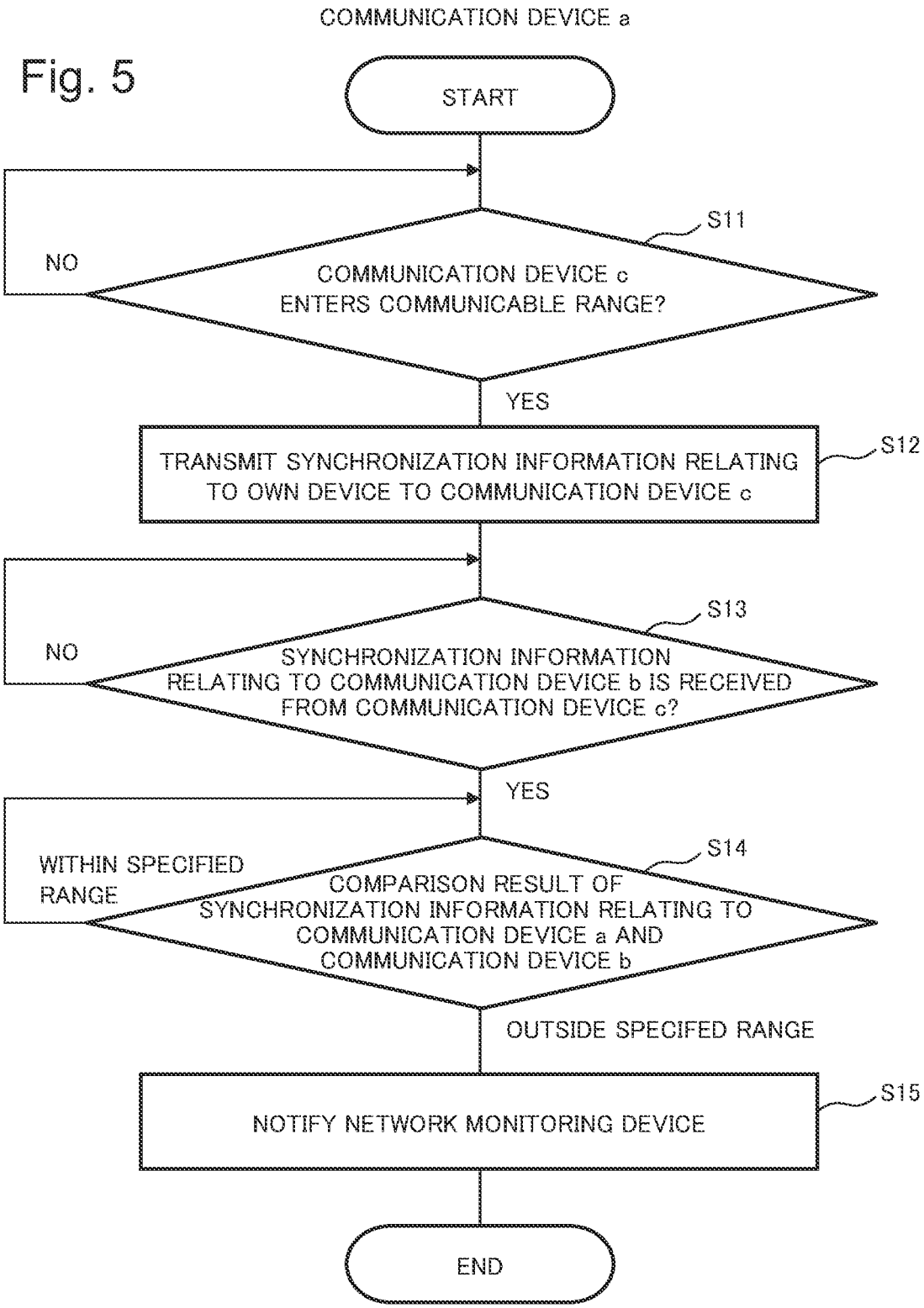

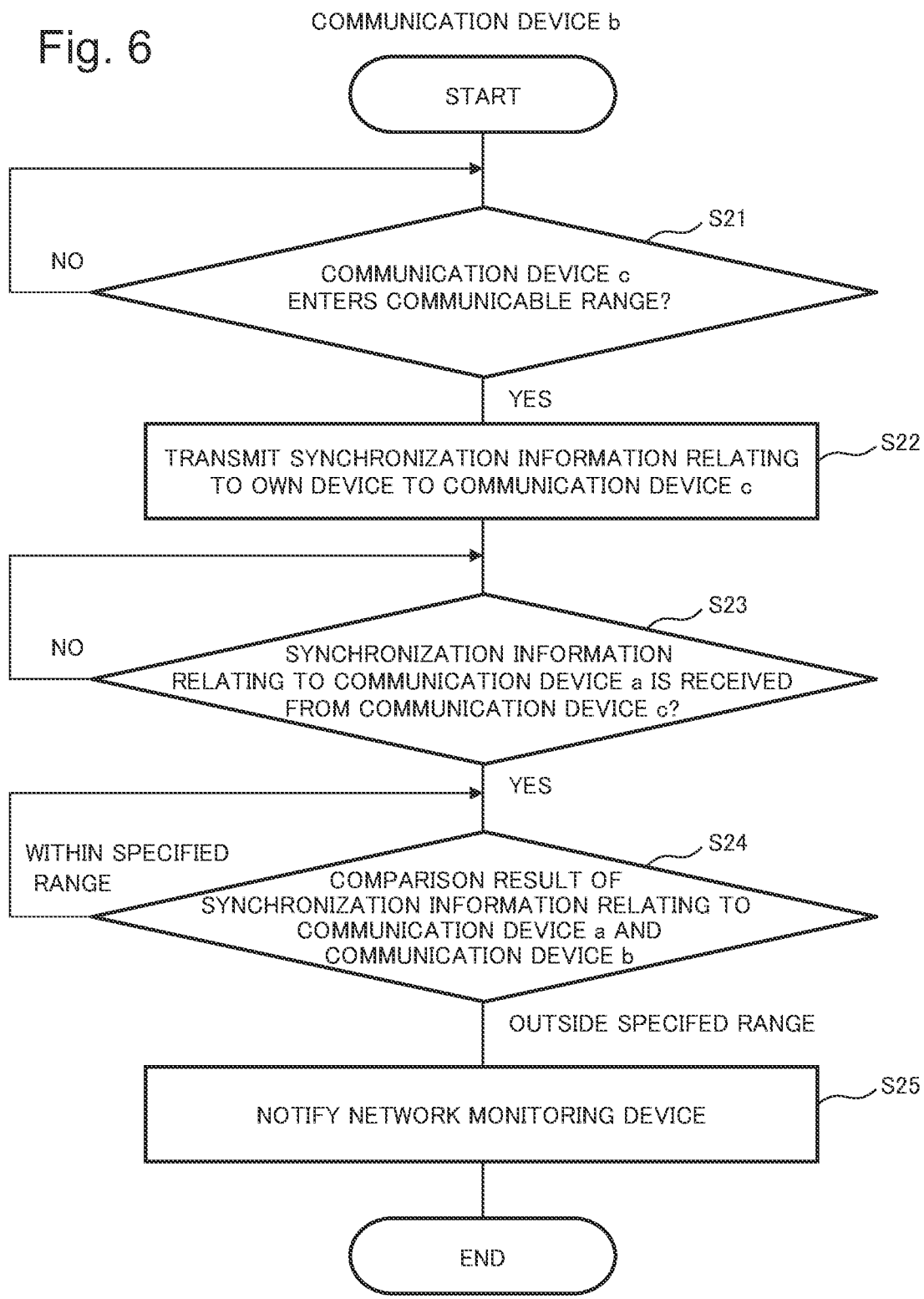

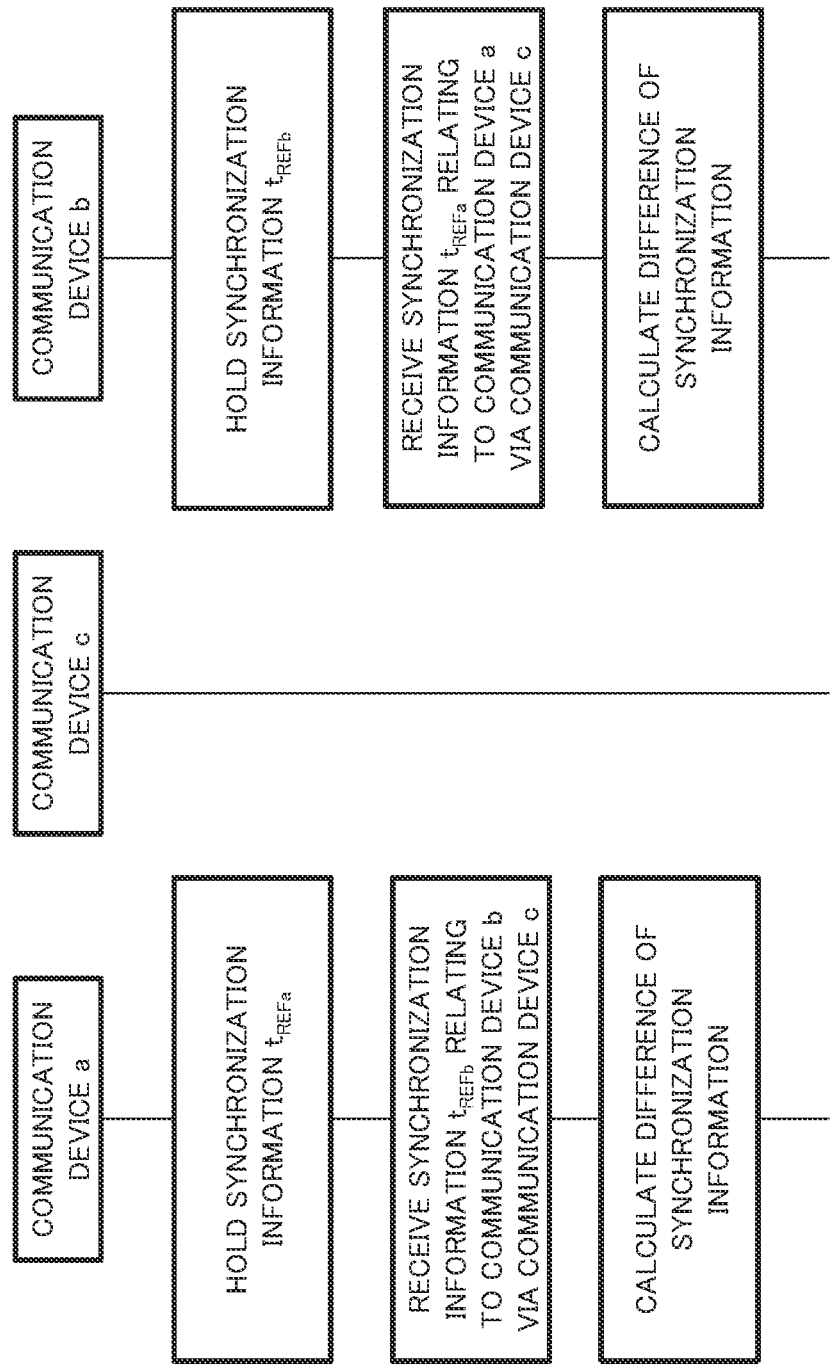

NETWORK SYNCHRONIZATION SYSTEM AND SYNCHRONIZATION METHOD FOR NETWORK SYSTEM

This application is based upon and claims the benefit of priority from Japanese Patent Application No. 2021-94087, filed on Jun. 4, 2021, the disclosure of which is incorporated herein in its entirety by reference.

TECHNICAL FIELD

The present invention relates to a network synchronization system and a synchronization method for a network system, and particularly relates to synchronization for a network positioned between two geographically apart points.

BACKGROUND ART

A protocol called Precision Time Protocol (PTP) is used for synchronization between devices on a network. Further, a method of synchronizing base stations arranged at different two points with high accuracy by using the PTP has been known. This highly accurate synchronization is one of techniques required for communication with a mobile terminal (for example, a handover method and Multiple-Input and Multiple-Output (MIMO) for communication with a plurality of antennas), and accuracy for such synchronization has various specifications according to applications to be used and is examined and specified in 3GPP (Third Generation Partnership Project) or the like.

However, in a current system, as a method of observing whether synchronization accuracy between two devices (a relative time error), which are two network devices, particularly, base stations positioned at two geographically apart points, falls within a value range required by the system, only one option in a current situation is to physically connect the devices at the two points to one measurement device for performing measurement. Further, it is apparent that the method in which base stations at two operational points are connected to one measurement device for performing measurement cannot be executed in a regular basis.

Japanese Patent Application Laid-Open No. 2013-93730 (JP2013-93730A) relates to signal synchronization between base stations in a network system in which base stations having different cell ranges are present in a mixed state, and proposes that synchronization between the base stations is achieved without using Global Positioning System (GPS), IEEE1588, or network listening. JP2013-93730A proposes that a mobile station uses a first reference signal being used for downstream synchronization with a femto base station, and a second reference signal being used for downstream synchronization with a macro base station. JP2013-93730A further proposes that the mobile station transmits, to the femto base station, a RACH-Preamble (RACH-P) signal associated with an eNB sequential number (a sequential number being identification information for inter-base-station synchronization) at a timing in response to a reception timing of the second reference signal, and that the femto base station transmits, to the mobile station, the first reference signal at a timing in response to a reception timing of the RACH-P signal associated with the eNB sequential number.

Japanese Patent Application Laid-Open No. 2009-235568 (JP2009-235568A) relates to synchronization control between base stations, and proposes that a mobile station receives data from a base station under connection at a predetermined timing and further receives a signal from an adjacent base station, thereby measuring the reception timings. JP2009-235568A further proposes that the base station under connection determines whether a difference between the reception timings falls within a predetermined threshold value range, by transmitting the measured reception timings from the mobile station to the base station under connection.

However, the above-mentioned synchronization methods in the background art have the following issues.

As a method of confirming whether synchronization accuracy between two devices being two network devices, particularly base stations positioned at two geographically apart points, falls within a value range required by a system, only one option in a current situation is to physically connect to one measurement device for performing measurement, and there is no facilitated way of confirming a synchronization accuracy state in real time.

JP2013-93730A has a limitation that transmission is required in a state and at a timing that are synchronized with a received signal, and has an issue that waiting for the timing is required at a time of transmission for synchronization.

The mobile station is required to measure all reception timings, and hence JP2009-235568A has an issue that a cost of the mobile station is increased due to measurement of the timings.

In view of the above-mentioned issues, an object of the present invention is to provide a network synchronization system and a synchronization method for a network system that achieve network synchronization for a network between geographically apart points.

SUMMARY

In order to achieve the object, a network synchronization system according to the present invention includes a first communication device positioned at a first point, a second communication device positioned at a second point being different from the first point, and a third communication device configured to communicate with the first communication device and the second communication device, and receive synchronization information relating to the first communication device from the first communication device, and then transmit the synchronization information relating to the first communication device to the second communication device.

An information terminal according to the present invention is an information terminal configured to communicate with a first communication device positioned at a first point and a second communication device positioned at a second point being different from the first point, and the information terminal receives synchronization information relating to the first communication device from the first communication device, and then transmits the synchronization information relating to the first communication device to the second communication device, or the information terminal receives synchronization information relating to the second communication device from the second communication device, and then transmits the synchronization information relating to the second communication device to the first communication device.

A synchronization method for a network system according to the present invention is a synchronization method for a network system including a first communication device positioned at a first point, a second communication device positioned at a second point being different from the first point, and a third communication device configured to communicate with the first communication device and the second communication device, and the third communication device receives synchronization information relating to the first communication device from the first communication device, and then transmits the synchronization information relating to the first communication device to the second communication device.

According to the present invention, network synchronization for a network between geographically apart points can be achieved.

BRIEF DESCRIPTION OF THE DRAWINGS

Exemplary features and advantages of the present invention will become apparent from the following detailed description when taken with the accompanying drawings in which:

FIG. 5 is a flowchart illustrating an operation of the communication device a in FIG. 2 and FIG. 3 during synchronization between the network devices;

FIG. 6 is a flowchart illustrating an operation of the communication device b in FIG. 2 and FIG. 3 during synchronization between the network devices;

FIG. 8A is a sequence chart illustrating reception of synchronization information and calculation of a difference between the communication device a and the communication device b;

EXAMPLE EMBODIMENT

Overview of Example Embodiment

A network synchronization system according to an example embodiment of the present invention includes two network devices and an information terminal that communicates with both of the devices. The network synchronization system according to the example embodiment of the present invention is characterized in that a synchronization state (accuracy) between the two network devices can be monitored by transmitting and receiving synchronization information relating to each of the two network devices via the information terminal positioned therebetween and comparing the synchronization information with each other.

In the network synchronization system according to the example embodiment of the present invention, when the synchronization information is exchanged via the information terminal moving between the two geographically apart points being an example of the two network devices, synchronization accuracy between the two network devices can be monitored in a regular basis, and abnormality of the system can be detected with rapidity.

[Example Embodiment of Superordinate Concept]

Figure 1:
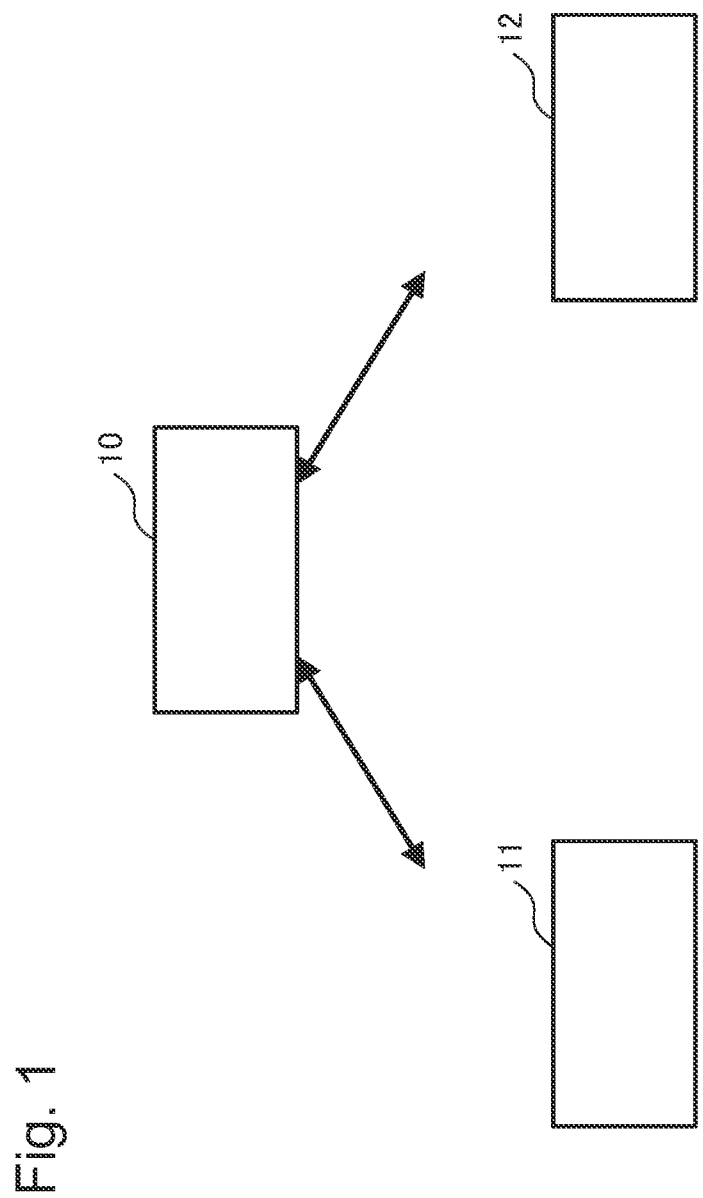
FIG. 1 is a block diagram illustrating a network synchronization system and a synchronization method for a network system according to an example embodiment of a superordinate concept of the present invention.

Before the description for the specific example embodiment, description is made on a network synchronization system and a synchronization method for a network system according to an example embodiment of a superordinate concept of the present invention. FIG. 1 is a block diagram illustrating the network synchronization system and the synchronization method for a network system according to the example embodiment of the superordinate concept of the present invention.

The network synchronization system in FIG. 1 includes a communication device 11 being one example of a first communication device positioned at a first point and a communication device 12 being one example of a second communication device positioned at a second point that is different from the first point. The communication device 11 positioned at the first point and the communication device 12 positioned at the second point are geographically apart from each other, and a state in which the synchronization information cannot be directly transmitted or received therebetween is assumed.

The network synchronization system in FIG. 1 further includes a communication device 10 being one example of a third communication device that communicates with the communication device 11 and the communication device 12. For example, the communication device 10 being one example of the third communication device in FIG. 1 receives synchronization information relating to the communication device 11 from the communication device 11, and then transmits the synchronization information relating to the communication device 11 to the communication device 12. Further, for example, the communication device 10 being one example of the third communication device in FIG. 1 receives synchronization information relating to the communication device 12 from the communication device 12, and then transmits the synchronization information relating to the communication device 12 to the communication device 11.

According to the network synchronization system and the network synchronization system according to the present example embodiment, the synchronization information relating to the communication device 11 and the synchronization information relating to the communication device 12 are exchanged via the communication device 10, and thus the synchronization information can be compared with each other between the communication device 11 and the communication device 12. With this, network synchronization for a network between geographically apart points can be achieved.

Moreover, unlike JP2013-93730A, the present example embodiment is not affected by a limitation that transmission is required in a state and at a timing that are synchronized with a received signal for achieving synchronization between the communication devices at the two different points. Therefore, synchronization between the communication devices at the two different points can be achieved without queueing for the timing, which is required at the time of transmission for synchronization in JP2013-93730A.

Moreover, unlike JP2009-235568A, the present example embodiment can achieve synchronization between the communication devices at the two different points without requiring the mobile station to measure reception timings from the base stations. Therefore, according to the present example embodiment, synchronization between the communication devices at the two different points can be achieved without a configuration of the mobile station that is required for measuring reception timings from the base stations. A preferred example embodiment of the present invention is described below in detail with reference to the drawings.

Example Embodiment

Figure 2:
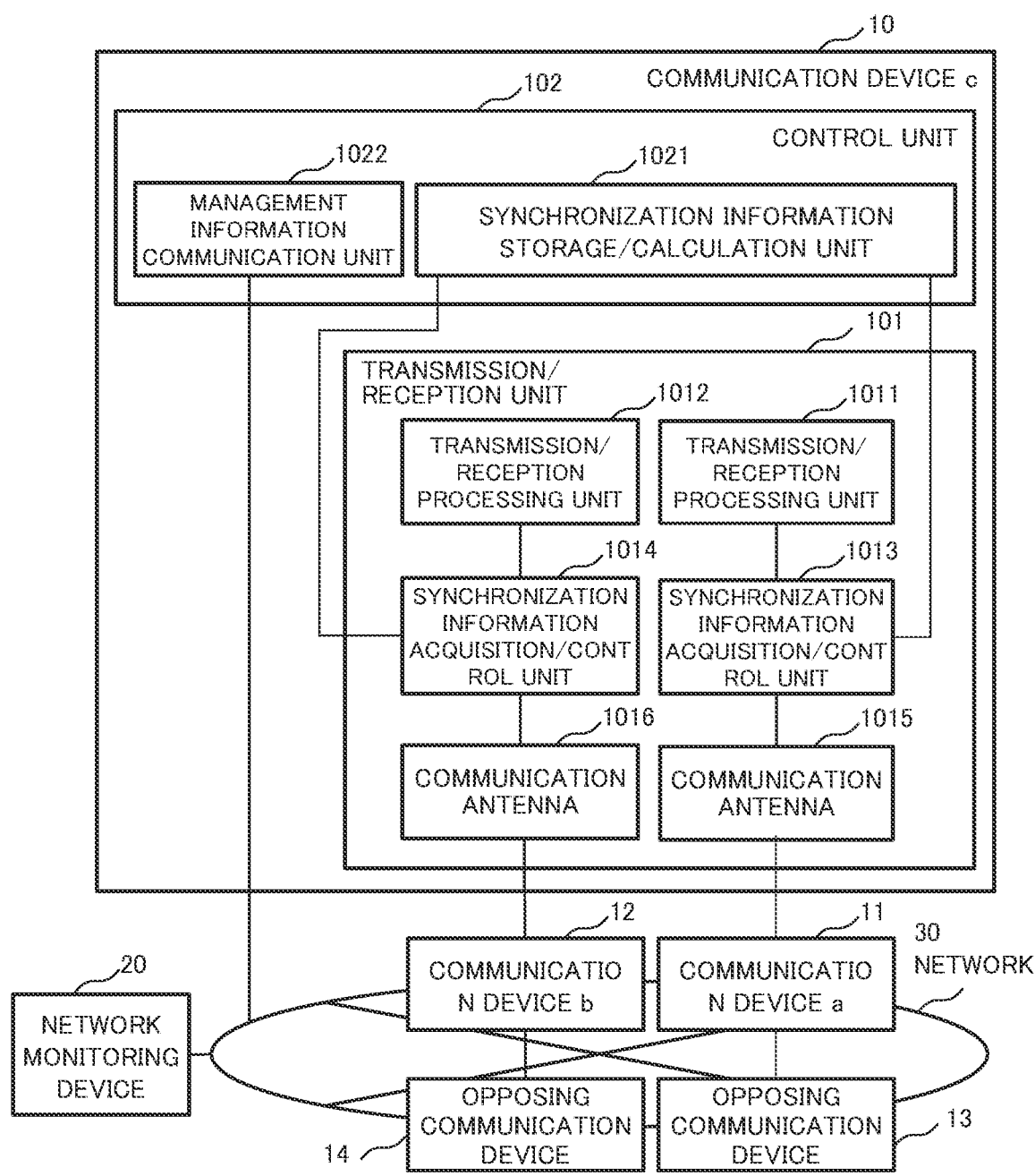
FIG. 2 is a block diagram illustrating a configuration of a network system to which the network synchronization system according to the example embodiment of the present invention is applied.
Figure 3:
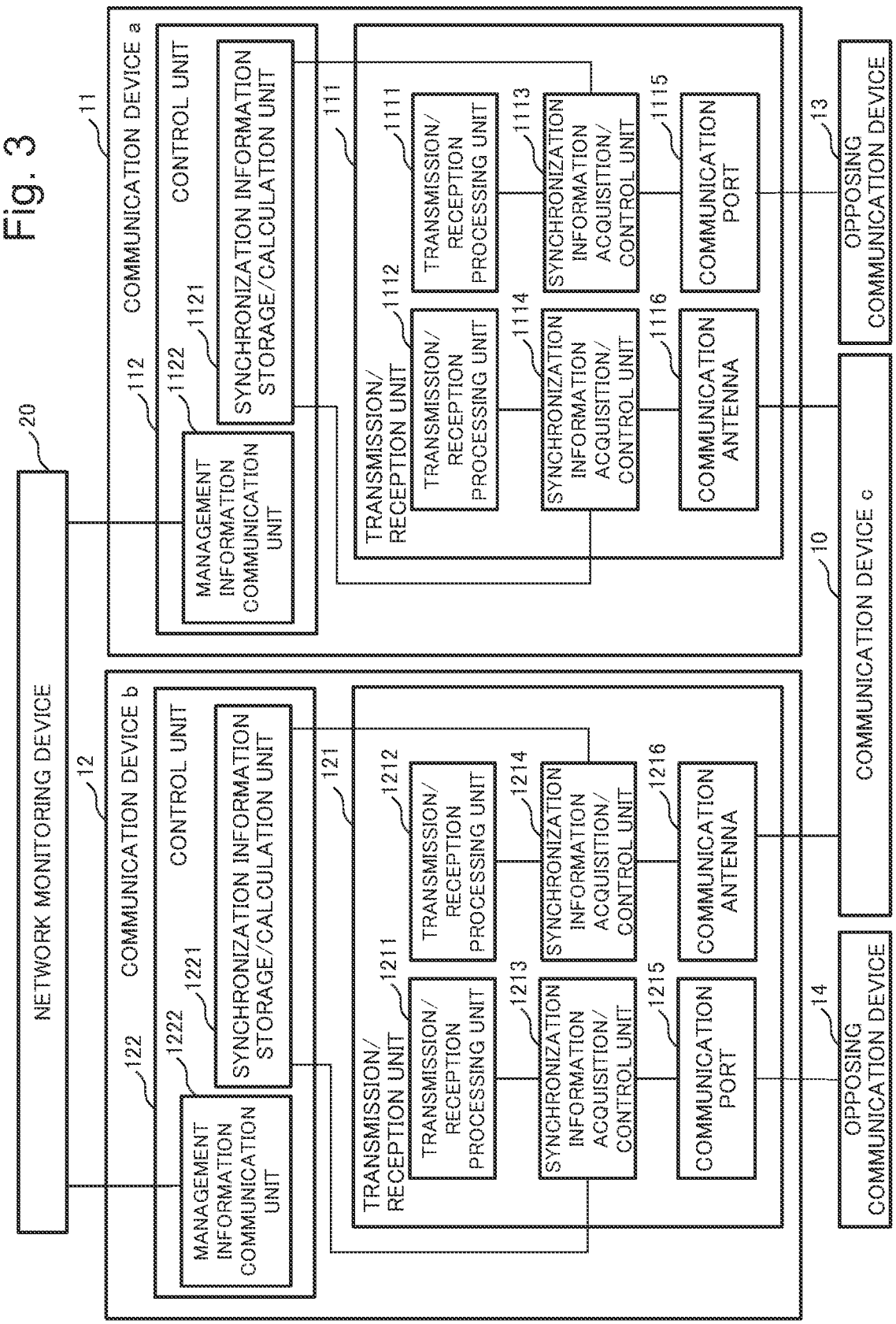
FIG. 3 is a block diagram illustrating a configuration of the network system to which the network synchronization system according to the example embodiment of the present invention is applied.

Description is made on a network synchronization system, an information terminal, and a synchronization method for a network system according to an example embodiment of the present invention. FIG. 2 is a block diagram illustrating a configuration of a network system to which the network synchronization system according to the example embodiment of the present invention is applied. FIG. 3 is a block diagram illustrating a configuration of the network system to which the network synchronization system according to the example embodiment of the present invention is applied.

(Configuration of Example Embodiment)

As illustrated in FIG. 2 and FIG. 3, the network synchronization system according to the present example embodiment includes the communication device 10, the communication device 11, and the communication device 12.

As illustrated in FIG. 2, the communication device 10 (also referred to as a communication device c) includes a transmission/reception unit 101 and a control unit 102. The transmission/reception unit 101 transmits and receives user data relating to the communication device 10, and exchanges the user data.

The transmission/reception unit 101 includes a transmission/reception processing unit 1011, a transmission/reception processing unit 1012, a synchronization information acquisition/control unit 1013, a synchronization information acquisition/control unit 1014, a communication antenna 1015, and a communication antenna 1016.

The transmission/reception processing unit 1011 and the transmission/reception processing unit 1012 transmit and receive the user data. The synchronization information acquisition/control unit 1013 acquires information for synchronization with an opposing communication device connected via the communication antenna 1015, and executes processing relating to the synchronization. The synchronization information acquisition/control unit 1014 acquires information for synchronization with an opposing communication device connected via the communication antenna 1016, and executes processing relating to the synchronization.

The communication antenna 1015 and the communication antenna 1016 are communication antennas of the communication device 10. The communication device 11 (also referred to as a communication device a) being one example of an opposing communication device on a network 30 is connected via the communication antenna 1015, and the communication device 12 (also referred to as a communication device b) being one example of an opposing communication device on the network 30 is connected via the communication antenna 1016.

The control unit 102 controls the synchronization information relating to the communication device 10, and determines occurrence of an unintended synchronization loss. The control unit 102 includes a synchronization information storage/calculation unit 1021 and a management information communication unit 1022.

The synchronization information storage/calculation unit 1021 stores the information for synchronization with the opposing devices, which is acquired from the synchronization information acquisition/control unit 1013 and the synchronization information acquisition/control unit 1014, and executes calculation of the synchronization information. The synchronization information acquisition/control unit 1013, the synchronization information acquisition/control unit 1014, and the synchronization information storage/calculation unit 1021 that are described above have a function capable of executing processing relating to Precision Time Protocol (PTP) for acquisition and control of the synchronization information, storage of the synchronization information, and calculation of the synchronization information.

The communication device 11 (also referred to as the communication device a), the communication device 12 (also referred to as the communication device b), an opposing communication device 13, an opposing communication device 14, and a network monitoring device 20 are connected to the network 30.

The network monitoring device 20 controls a state of the communication device 10. The management information communication unit 1022 of the control unit 102 is connected to the network monitoring device 20 on the network 30, and communicates with the network monitoring device 20 when the state of the communication device 10 is changed, or an acquisition request of the state of the communication device 10 is received from the network monitoring device 20.

As illustrated in FIG. 3, the communication device 11 (also referred to as the communication device a) includes a transmission/reception unit 111 and a control unit 112. The transmission/reception unit 111 transmits and receives the user data relating to the communication device 10, and exchanges the user data. The control unit 112 controls the synchronization information relating to the communication device 11, and determines occurrence of an unintended synchronization loss.

The transmission/reception unit 111 includes a transmission/reception processing unit 1111, a transmission/reception processing unit 1112, a synchronization information acquisition/control unit 1113, a synchronization information acquisition/control unit 1114, a communication port 1115, and a communication antenna 1116.

The transmission/reception processing unit 1111 and the transmission/reception processing unit 1112 of the transmission/reception unit 111 transmits and receives the user data. The synchronization information acquisition/control unit 1113 of the transmission/reception unit 111 acquires information for synchronization with the opposing communication device 13 connected via the communication port 1115, and executes processing relating to the synchronization. The synchronization information acquisition/control unit 1114 of the transmission/reception unit 111 acquires information for synchronization with an opposing communication device connected via the communication antenna 1116, and executes processing relating to the synchronization.

The communication port 1115 is connected to the opposing communication device 13. The communication antenna

1116 is a communication antenna of the communication device 11, and is connected to the communication device 10 (also referred to as the communication device c) via the communication antenna 1116.

The control unit 112 of the communication device 11 includes a synchronization information storage/calculation unit 1121 and a management information communication unit 1122. The management information communication unit 1122 is connected to the network monitoring device 20 on the network 30, which is illustrated in FIG. 2.

The synchronization information storage/calculation unit 1121 stores the information for synchronization with the opposing devices, which is acquired from the synchronization information acquisition/control unit 1113 and the synchronization information acquisition/control unit 1114, and executes calculation of the synchronization information. The synchronization information acquisition/control unit 1113, the synchronization information acquisition/control unit 1114, and the synchronization information storage/calculation unit 1121 that are described above have a function capable of executing processing relating to Precision Time Protocol (PTP) for acquisition and control of the synchronization information, storage of the synchronization information, and calculation of the synchronization information.

Moreover, as illustrated in FIG. 3, the communication device 12 (also referred to as the communication device b) includes a transmission/reception unit 121 and a control unit 122. The transmission/reception unit 121 transmits and receives the user data relating to the communication device 12, and exchanges the user data. The control unit 122 controls the synchronization information relating to the communication device 12, and determines occurrence of an unintended synchronization loss.

The transmission/reception unit 121 includes a transmission/reception processing unit 1211, a transmission/reception processing unit 1212, a synchronization information acquisition/control unit 1213, a synchronization information acquisition/control unit 1214, a communication port 1215, and a communication antenna 1216.

The transmission/reception processing unit 1211 and the transmission/reception processing unit 1212 of the transmission/reception unit 121 transmit and receive the user data. The synchronization information acquisition/control unit 1213 of the transmission/reception unit 121 acquires information for synchronization with the opposing communication device 14 connected via the communication port 1215, and executes processing relating to the synchronization. The synchronization information acquisition/control unit 1214 of the transmission/reception unit 121 acquires information for synchronization with an opposing communication device connected via the communication antenna 1216, and executes processing relating to the synchronization.

The communication port 1215 is connected to the opposing communication device 14. The communication antenna 1216 is a communication antenna of the communication device 12, and the communication device 10 (also referred to as the communication device c) is connected via the communication antenna 1216.

The control unit 122 of the communication device 12 includes a synchronization information storage/calculation unit 1221 and a management information communication unit 1222. The management information communication unit 1222 is connected to the network monitoring device 20 on the network 30, which is illustrated in FIG. 2.

The synchronization information storage/calculation unit 1221 stores the information for synchronization with the opposing devices, which is acquired from the synchronization information acquisition/control unit 1213 and the synchronization information acquisition/control unit 1214, and executes calculation of the synchronization information. The synchronization information acquisition/control unit 1213, the synchronization information acquisition/control unit 1214, and the synchronization information storage/calculation unit 1221 that are described above have a function capable of executing processing relating to Precision Time Protocol (PTP) for acquisition and control of the synchronization information, storage of the synchronization information, and calculation of the synchronization information.

When connection is established with the network monitoring device 20 that controls a state of the communication device 11, and the state of the communication device 11 is changed, or when an acquisition request of the state of the communication device 11 is received from the network monitoring device 20, the management information communication unit 1122 communicates with the network monitoring device 20.

(Format of Synchronization Information)

It is considered that what is shown in Appendix 1.6 in ITU-T G.8271, Recommendation, the Internet <https://www.itu.int/rec/T-REC-G.8271-202003-I> is used as the synchronization information in the present example embodiment, for example. It is also considered that what is shown in Section 6.4 or Section 6.5 in ITU-T G.8260, Recommendation, the Internet <https://www.itu.int/rec/T-REC-G.8260-202003-I> is used as the synchronization information in the present example embodiment.

(Operation in Example Embodiment)

Figure 4A:
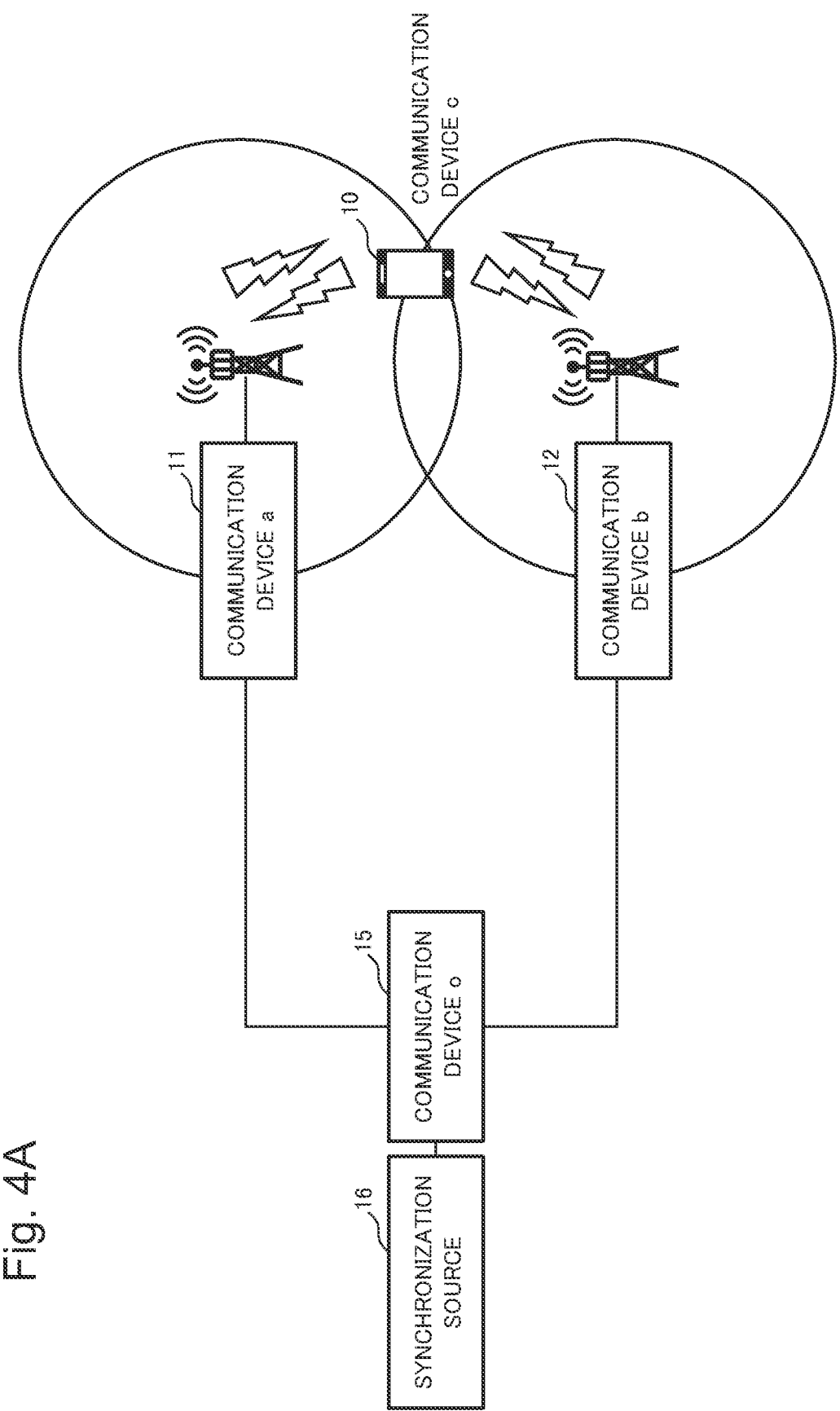
FIG. 4A is a block diagram illustrating one example of synchronization between a communication device a and a communication device b, as synchronization between two network devices.
Figure 4B:
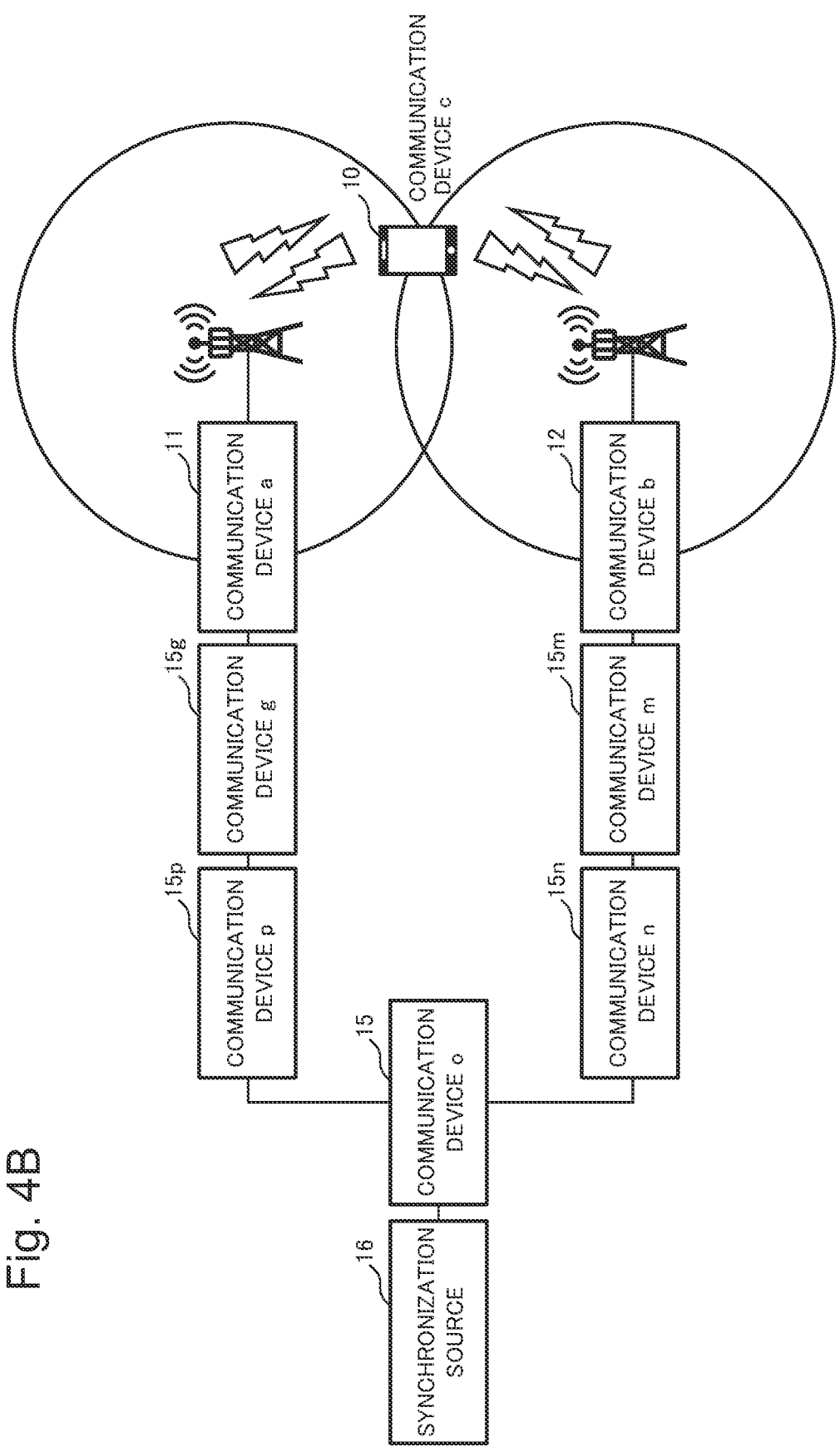
FIG. 4B is a block diagram illustrating another example of synchronization between the communication device a and the communication device b, as synchronization between two network devices.

With reference to FIG. 4A, FIG. 4B, FIG. 5, FIG. 6, and FIG. 7, an operation of the network synchronization system, the synchronization method for a network system, and a monitoring method for synchronization accuracy according to the present example embodiment are described. FIG. 4A is a block diagram illustrating one example of synchronization between the communication device a and the communication device b, as synchronization between the two network devices. FIG. 4B is a block diagram illustrating another example of synchronization between the communication device a and the communication device b, as synchronization between the two network devices.

Figure 7:
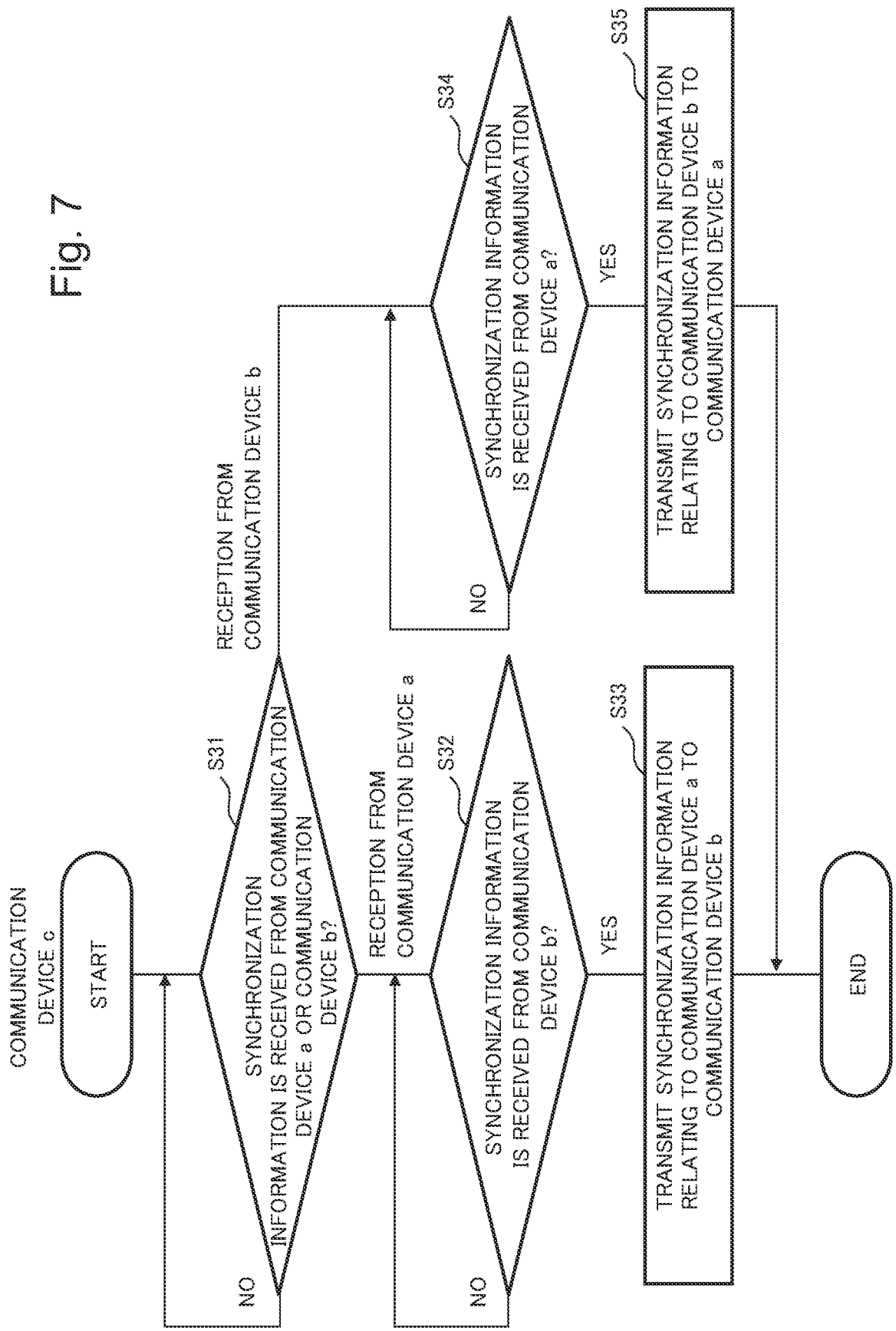
FIG. 7 is a flowchart illustrating an operation of the communication device c in FIG. 2 and FIG. 3 during synchronization between the network devices.

FIG. 5 is a flowchart illustrating an operation of the communication device a in FIG. 2 and FIG. 3 during synchronization between the network devices. FIG. 6 is a flowchart illustrating an operation of the communication device b in FIG. 2 and FIG. 3 during synchronization between the network devices. FIG. 7 is a flowchart illustrating an operation of the communication device c in FIG. 2 and FIG. 3 during synchronization between the network devices.

As illustrated in FIG. 4A, a synchronization source 16 and a communication device o (a communication device 15) are connected to each other, the communication device o and the communication device a (the communication device 11) are connected to each other, and the communication device o and the communication device b (the communication device 12) are connected to each other. It is assumed that the communication device a operates while acquiring the synchronization information from the synchronization source 16 via the communication device o, that the communication device b operates while acquiring the synchronization information from the synchronization source 16 via the communication device o, and that the communication device a and the communication device b are geographically apart from each other. In FIG. 4A, the communication device a is one base station in a mobile communication system and communicates with an information terminal being one example of the communication device c in a cell, and the communication device b is one base station in the mobile communication system and communicates with the information terminal being one example of the communication device c in the cell.

As illustrated in FIG. 4B, the synchronization source 16 and the communication device o (the communication device 15) are connected to each other, the communication device o and the communication device a (the communication device 11) are connected to each other via a communication device p (a communication device 15p) and a communication device q (a communication device 15q). Further, the communication device o and the communication device b (the communication device 12) are connected to each other via a communication device n (a communication device 15n) and a communication device m (a communication device 15m). It is assumed that the communication device a operates while acquiring the synchronization information from the synchronization source 16 via the communication device o, the communication device p, and the communication device q, that the communication device b operates while acquiring the synchronization information from the synchronization source 16 via the communication device o, the communication device n, and the communication device m, and that the communication device a and the communication device b are geographically apart from each other. In FIG. 4B, the communication device a is one base station in the mobile communication system and communicates with the information terminal being one example of the communication device c in the cell, and the communication device b is one base station in the mobile communication system and communicates with the information terminal being one example of the communication device c in the cell.

It is assumed that the communication device a and the communication device b use PTP and are synchronized with the synchronization source 16 in FIG. 4A and FIG. 4B. Further, the synchronization information transmitted and received via the communication device c presupposes PTP.

First, the operation of the communication device a is described. As illustrated in FIG. 5, the communication device a determines whether the communication device c is in a state capable of communicating with the communication device a (Step S11). When the communication device c enters a transmittable/receivable region being one example of a communicable range, communication relating to the synchronization information is started between the transmittable/receivable devices (between the communication device a and the communication device c). In other words, the communication device a in a communicable state transmits the synchronization information relating to the own device to the communication device c (Step S12). In this state, the communication device c may process or discard the synchronization information transmitted from the communication device a.

Subsequently, the communication device a determines whether the synchronization information relating to the communication device b is received from the communication device c (Step S13), and the communication device a repeats this determination until the synchronization information relating to the communication device b is received from the communication device c.

When it is determined that the synchronization information relating to the communication device b is received from the communication device c (YES in Step S13), the communication device a compares the synchronization information relating to the own device and the synchronization information relating to the communication device b, which is received from the communication device c, with each other, and determines the comparison result of the synchronization information falls within the specified range or does not fall within the specified range (Step S14). When the comparison result of the synchronization information in the determination in Step S14 falls within the specified range, this determination is repeated. When the comparison result of the synchronization information does not fall within the specified range, the communication device a notifies the network monitoring device 20 of occurrence of a synchronization loss (Step S15).

Next, the operation of the communication device b is described. As illustrated in FIG. 6, the communication device b determines whether the communication device c is in a state capable of communicating with the communication device b (Step S21). When the communication device c enters the transmittable/receivable region being one example of the communicable range, communication relating to the synchronization information is started between the transmittable/receivable devices (between the communication device b and the communication device c). In other words, the communication device b in a communicable state transmits the synchronization information relating to the own device to the communication device c (Step S22). In this state, the communication device c may process or discard the synchronization information transmitted from the communication device b.

Subsequently, the communication device b determines whether the synchronization information relating to the communication device a is received from the communication device c (Step S23), the communication device b repeats this determination until the synchronization information relating to the communication device a is received from the communication device c.

When it is determined that the synchronization information relating to the communication device a is received from the communication device c (YES in Step S23), the communication device b compares the synchronization information relating to the own device and the synchronization information relating to the communication device a, which is received from the communication device c, with each other, and determines the comparison result of the synchronization information falls within the specified range or does not fall within the specified range (Step S24). When the comparison result of the synchronization information in the determination in Step S24 falls within the specified range, this determination is repeated. When the comparison result of the synchronization information does not fall within the specified range, the communication device b notifies the network monitoring device 20 of occurrence of a synchronization loss (Step S25).

Next, the operation of the communication device c is described. When the communication device c enters the transmittable/receivable region with any one of the communication device a and the communication device b, communication relating to the synchronization information is started between the transmittable/receivable devices.

When the communication device a or the communication device b is in a communicable state with the communication device c, the communication device c receives the synchronization information thereof. The communication device c determines the synchronization information is received from the communication device a or the communication device b (Step S31), and this determination is repeated until the synchronization information is received from any one of the communication device a and the communication device b.

The process proceeds to Step S32 when it is determined that the synchronization information is received from the communication device a in Step S31, and the process proceeds to Step S34 when it is determined that the synchronization information is received from the communication device b.

Subsequently, when the other one with which the communication device c does not start communication in the description given above enters the transmittable/receivable region, communication relating to the synchronization information is newly started between the transmittable/receivable devices. In this state, it is assumed that there is established a state in which communication relating to the synchronization information is executed with the communication device a and the communication device b. The communication device c determines whether the synchronization information is received from the communication device b (Step S32), and repeats this determination until the synchronization information is received from the communication device b. When the synchronization information is received from the communication device b in Step S32 (YES in Step S32), the communication device c transmits, to the communication device b, the synchronization information relating to the communication device a (Step S33). The communication device c determines whether the synchronization information is received from the communication device a (Step S34), and repeats this determination until the synchronization information is received from the communication device a. When the synchronization information is received from the communication device a in Step S34 (YES in Step S42), the communication device c transmits, to the communication device a, the synchronization information relating to the communication device b (Step S35).

In this manner, the communication device a can acquire the synchronization information relating to the communication device b via the communication device c. Similarly, the communication device b can acquire the synchronization information relating to the communication device a via the communication device c.

When each of the communication device a and the communication device b compares the synchronization information thus acquired with the synchronization information with which each of the communication device a and the communication device b is synchronized from the synchronization source 16, monitoring can be executed for an extent of synchronization accuracy between the synchronization source 16 and each of the devices, occurrence of deviation in the synchronization, or the like.

Advantageous Effects of Example Embodiment

According to the present example embodiment, the advantageous effects listed below are exerted.

With respect to synchronization accuracy of the communication devices at the two different points, the synchronization information can be acquired via the communication device such as an information terminal present between the two points. With this, synchronization accuracy of each of the communication devices can be grasped for each of the communication devices at the two different points. With this, synchronization accuracy of the communication devices at the two different points can be measured without preparing special measurement equipment.

In a case of the system illustrated in FIG. 4A, the synchronization is only executed between the communication device a and the communication device o and between the communication device b the communication device o in the background art, whereas, in the present example embodiment, the synchronization information can be compared between the communication device a and the communication device b while exchanging the synchronization information via the communication device c.

Synchronization accuracy of the communication devices at the two different points can be measured without preparing special measurement equipment. With this, a failure state such as deviation from the specified value can be detected and notified. With this, a measure can be taken quickly with respect to a factor that may leads to a communication failure.

Moreover, unlike JP2013-93730A, the present example embodiment is not affected by a limitation that transmission is required in a state and at a timing that are synchronized with a received signal for achieving synchronization between the communication devices at the two different points. Therefore, synchronization between the communication devices at the two different points can be achieved without queueing for the timing, which is required at the time of transmission for synchronization in JP2013-93730A.

Moreover, unlike JP2009-235568A, the present example embodiment can achieve synchronization between the communication devices at the two different points without requiring the mobile station to measure reception timings from the base stations. Therefore, according to the present example embodiment, synchronization between the communication devices at the two different points can be achieved without a configuration of the mobile station that is required for measuring reception timings from the base stations.

Moreover, when the network monitoring device 20 is connected to the communication devices from the synchronization source 16 to the communication device a and the communication device b (the communication device o, the communication device a, and the communication device b) illustrated in FIG. 4A, the following advantageous effects can also be exerted.

The network monitoring device 20 can monitor synchronization accuracy of the communication device a and the communication device b, and hence the network monitoring device 20 can issue an instruction of calibration relating to synchronization to each of the communication devices including the synchronization source 16, the communication device a, and the communication device b in order to restore a network synchronization state when a failure state such as deviation from the specified value is detected in the network synchronization state. With this, restoration from synchronization deviation can be attempted. [Other Example Embodiments]

The preferred example embodiment of the present invention is described above, but the present invention is not limited thereto.

The synchronization information used in the example embodiment is not limited to what is shown in ITU-T G.8271 Recommendation or ITU-T G.8260 Recommendation. For example, when (1) $t_{REFa}-t_{REFb}$ is a result of calculation being a difference between acquired synchronization information (time information) $t_{REFa}$ relating to the communication device a subordinate to a host device and the synchronization information relating to the communication device b (time information) acquired by the communication device a from the communication device c, and (2) $t_{REFb}-t_{REFa}$ is a result of calculation being a difference between acquired synchronization information (time information) $t_{REFb}$ relating to the communication device b subordinate to the host device and the synchronization information relating to the communication device a (time information) acquired by the communication device b from the communication device c, the communication device a and the communication device b exchange those values via the communication device c and compare the differences that are previously calculated by the own devices and the received calculation results being the differences, thereby confirming synchronization accuracy.

FIG. 8A shows a sequence chart illustrating reception of the synchronization information and calculation of the difference between the communication device a and the communication device b. The communication device a in FIG. 8A holds the synchronization information $t_{REFa}$. Subsequently, the communication device a receives the synchronization information $t_{REFb}$ relating to the communication device b via the communication device c. Then, the communication device a calculates a difference of the synchronization information between the held synchronization information $t_{REFa}$ and the received the synchronization information $t_{REFb}$ relating to the communication device b. The communication device b in FIG. 8A holds the synchronization information $t_{REFb}$. Subsequently, the communication device b receives the synchronization information $t_{REFa}$ relating to the communication device a via the communication device c. Then, the communication device b calculates a difference of the synchronization information between the holding synchronization information $t_{REFb}$ and the received synchronization information $t_{REFa}$ relating to the communication device a.

Figure 8B:
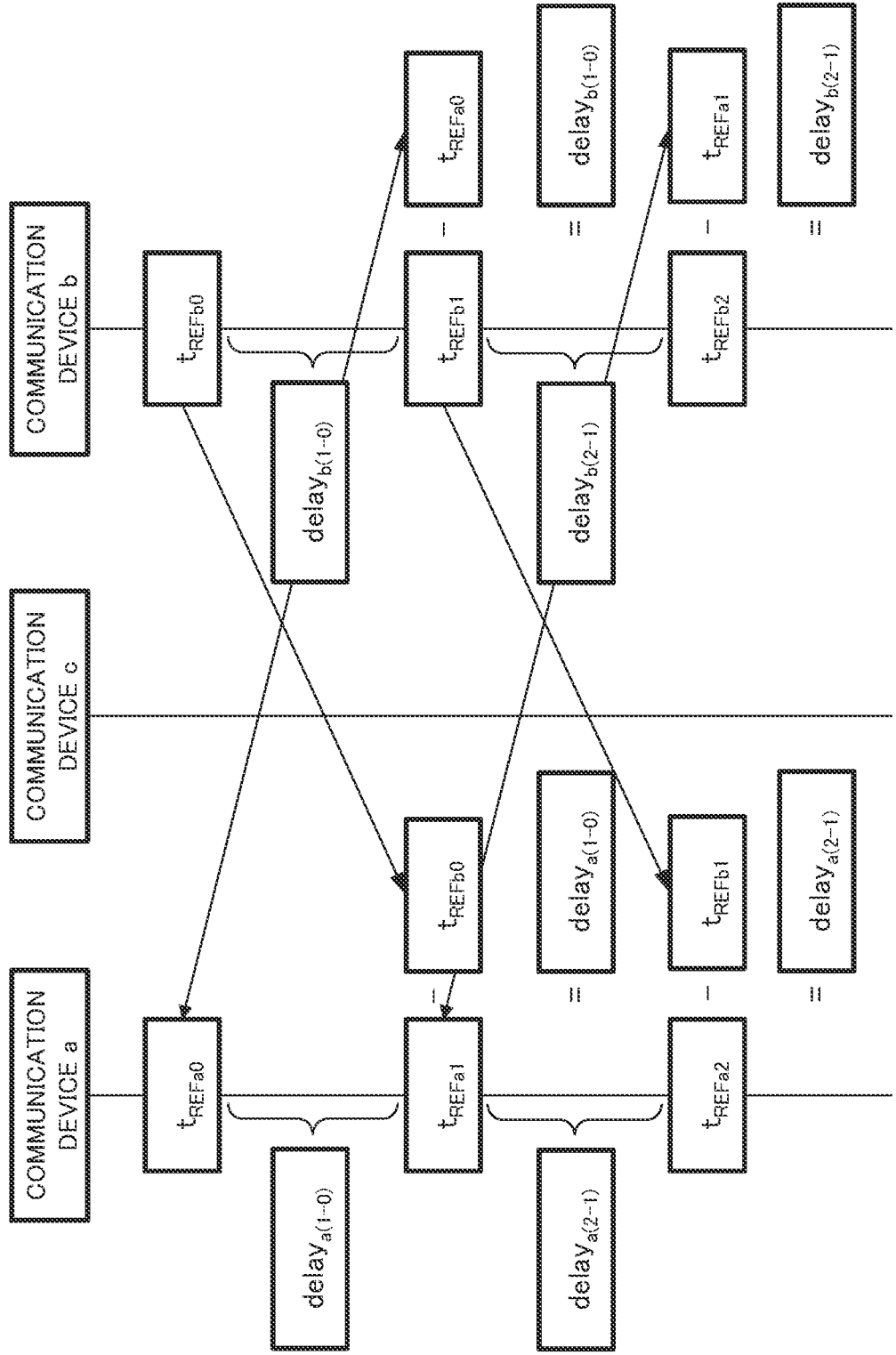
FIG. 8B is a sequence chart illustrating reception of synchronization information and calculation of a difference between the communication device a and the communication device b, for detailed description of the contents in FIG. 8A.

Moreover, FIG. 8B shows a sequence chart illustrating reception of the synchronization information and calculation of the difference between the communication device a and the communication device b, in a more detailed manner. With reference to the communication device a in FIG. 8B, the communication device a acquires $t_{REFa1} - t_{REFb0}$ ($= \text{delay}_{a(1-0)}$) as a calculation result being the difference of the synchronization information (time information), based on the synchronization information (time information) $t_{REFa0}$, which is acquired through subordination to the host device, a delay time $\text{delay}_{a(1-0)}$ therebetween, and the synchronization information relating to the communication device b (time information):$t_{REFb0}$, which is acquired via the communication device c. Moreover, the communication device a acquires $t_{REFa2} - t_{REFb1}$ ($= \text{delay}_{a(2-1)}$) as a calculation result being the difference of the synchronization information (time information), based on a delay time $\text{delay}_{a(2-1)}$, the synchronization information $t_{REFb1}$ relating to the communication device b (time information), which is acquired via the communication device c. The differences that are calculated by the own devices before in the previous sequence and the received calculation results being the differences are compared with each other, thereby confirming synchronization accuracy. The reception of the synchronization and the calculation of the difference by the communication device b in FIG. 8B can be executed in a similar manner to the reception of the synchronization and the calculation of the difference by the communication device a.

In the above-mentioned example embodiment, comparison of synchronization accuracy is executed in the communication device a or the communication device b, but comparison of synchronization accuracy may also be executed in the communication device c. As illustrated in FIG. 3, the communication device a includes the synchronization information storage/calculation unit 1121 in the control unit 112, the communication device b includes the synchronization information storage/calculation unit 1221 in the control unit 122, the communication device a is capable of executing comparison of synchronization accuracy in the synchronization information storage/calculation unit 1121, and the communication device b is capable of executing comparison of synchronization accuracy in the synchronization information storage/calculation unit 1221. Meanwhile, as illustrated in FIG. 2, the communication device c includes the synchronization information storage/calculation unit 1021 in the control unit 102, and the communication device c is capable of executing comparison of synchronization accuracy in the synchronization information storage/calculation unit 1021. The communication device c in a state of YES in Step S32 or Yes in Step S34 in FIG. 7 receives the synchronization information relating to the communication device a and the synchronization information relating to the communication device b, and the communication device c is also capable of executing comparison of synchronization accuracy by using the synchronization information.

Further, in the above-mentioned example embodiment, comparison of synchronization accuracy is executed both in the communication device a and the communication device b, but may be executed in one of the communication device a and the communication device b.

Figure 9:
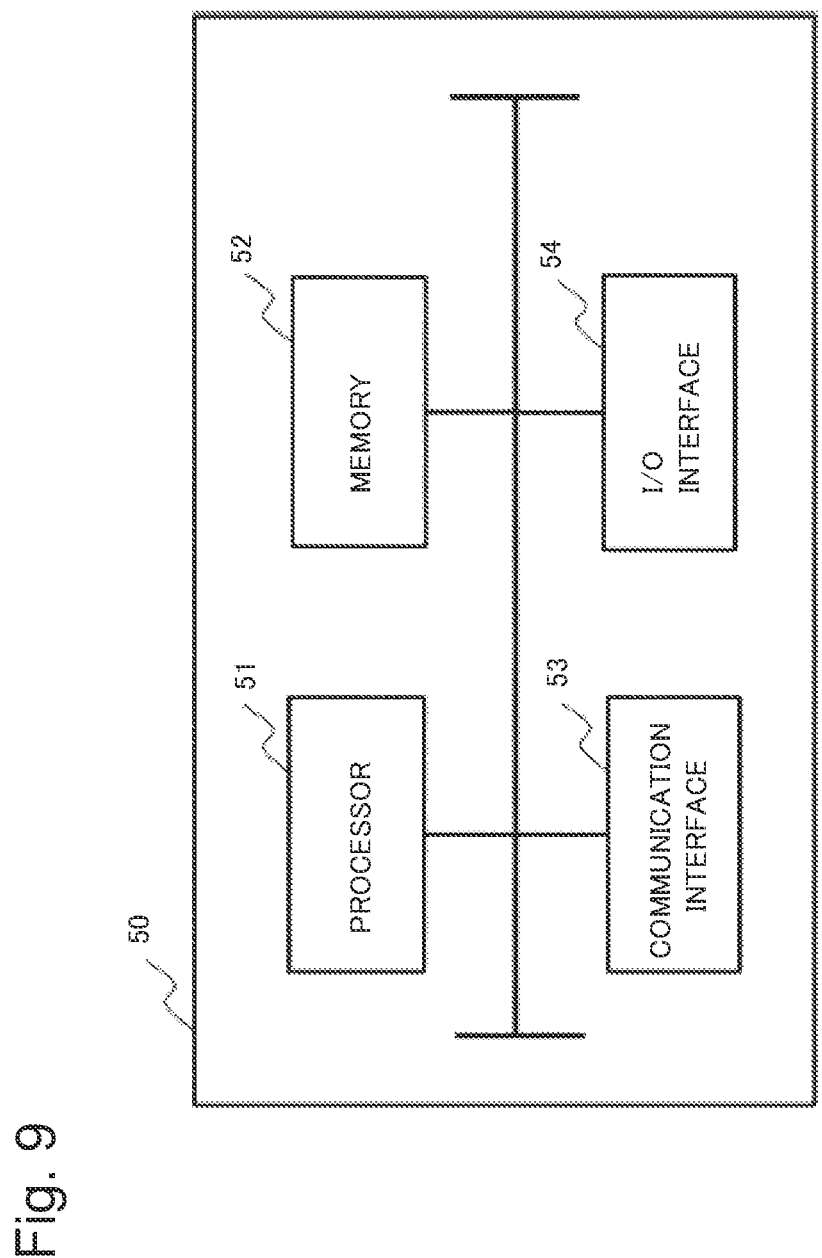
FIG. 9 is a block diagram illustrating an example of configuration about an information terminal to achieve a communication device 10 shown in FIG. 2.

The communication device 10 (also referred to as a communication device c) described in the above-mentioned embodiment can be achieved by an information terminal including a processor such as Central Processing Unit (CPU) and Micro-Processing Unit (MPU), and a memory. FIG. 9 is a block diagram illustrating an example of configuration about an information terminal to achieve a communication device 10 shown in FIG. 2. The information terminal 50 shown in FIG. 9 includes a processor 51 represented by CPU or MPU, and a memory represented by Random Access Memory (RAM) or Read Only Memory (ROM). In addition, the information terminal 50 shown in FIG. 9 further includes a communication interface 53, Input/Output (I/O) interface 54, and the like.

The communication interface 53 in the information terminal 50 is an interface configured to communicate with a first communication device positioned at a first point, and to communicate with a second communication device positioned at a second point being different from the first point. The I/O interface 54 is an interface provided for an operator or a manager of the information terminal 50 to operate the information terminal 50, or to draw out information from the information terminal 50. For an example, the information terminal 50 receives synchronization information relating to the first communication device from the first communication device, and then transmits the synchronization information relating to the first communication device to the second communication device, via the communication interface 53. For another example, the information terminal 50 receives synchronization information relating to the second communication device from the second communication device, and then transmits the synchronization information relating to the second communication device to the first communication device, via the communication interface 53.

The information terminal 50 including the processor 51 and the memory 52 can achieve a function such as a synchronization information acquisition function to acquire the synchronization information relating to the first communication device and the synchronization information relating to the second communication device, and a synchronization information calculation function to compare the acquired synchronization information relating to the first communication device with the acquired synchronization information relating to the second communication device, and determine whether a comparison result of the synchronization information falls within a specified range, by reading and executing a program.

In addition, such a program can be distributed in the form of a recording medium in which the program is recorded. This program can be distributed in a form of a general-purpose semiconductor recording device such as a Compact Flash (CF; registered trademark) and a Secure Digital (SD), a magnetic recording medium such as a flexible disk, an optical recording medium such as a Compact Disc Read Only Memory (CD-ROM), or the like.

As a matter of course, various changes may be made in the above-mentioned preferred example embodiment of the present invention without departing from the scope of the present invention defined by the claims, and those changes are also included in the scope of the present invention.

The whole or part of the example embodiments disclosed above can be described as, but not limited to, the following supplementary notes.

(Supplementary Note 1) A network synchronization system including:
 a first communication device positioned at a first point;
 a second communication device positioned at a second point being different from the first point; and
 a third communication device configured to communicate with the first communication device and the second communication device, and receive synchronization information relating to the first communication device from the first communication device, and then transmit the synchronization information relating to the first communication device to the second communication device.

(Supplementary Note 2) The network synchronization system according to Supplementary Note 1, wherein
 the second communication device compares synchronization information relating to an own device with the synchronization information relating to the first communication device being received from the third communication device, and determines whether a comparison result of the synchronization information falls within a specified range.

(Supplementary Note 3) The network synchronization system according to Supplementary Note 1 or 2, wherein
 the third communication device receives synchronization information relating to the second communication device from the second communication device, and then transmits the synchronization information relating to the second communication device to the first communication device.

(Supplementary Note 4) The network synchronization system according to Supplementary Note 3, wherein
 the first communication device compares synchronization information relating to an own device with the synchronization information relating to the second communication device being received from the third communication device, and determines whether a comparison result of the synchronization information falls within a specified range.

(Supplementary Note 5) The network synchronization system according to one of Supplementary Notes 1 to 4, wherein
 the third communication device is a wireless terminal, and the first communication device and the second communication device are base stations that communicate with the third communication device.

(Supplementary Note 6) The network synchronization system according to any one of Supplementary Notes 2, 4, and 5, wherein
 the synchronization information relating to the first communication device and the synchronization information relating to the second communication device are synchronization information provided from an identical synchronization source via different routes.

(Supplementary Note 7) A network monitoring system including:
 the network synchronization system according to any one of Supplementary Notes 2, 4, and 6; and
 a network monitoring device configured to monitor the first communication device and the second communication device, and receive a notice from any one of the first communication device and the second communication device that determines that a comparison result of the synchronization information does not fall within a specified range.

(Supplementary Note 8) An information terminal configured to communicate with a first communication device positioned at a first point and a second communication device positioned at a second point being different from the first point, and receive synchronization information relating to the first communication device from the first communication device, and then transmit the synchronization information relating to the first communication device to the second communication device, or receive synchronization information relating to the second communication device from the second communication device, and then transmit the synchronization information relating to the second communication device to the first communication device.

(Supplementary Note 9) The information terminal according to Supplementary Note 8, further including:
 a synchronization information acquisition unit configured to acquire the synchronization information relating to the first communication device and the synchronization information relating to the second communication device; and
 a synchronization information calculation unit configured to compare the acquired synchronization information relating to the first communication device with the acquired synchronization information relating to the second communication device, and determine whether a comparison result of the synchronization information falls within a specified range.

(Supplementary Note 10) A synchronization method for a network system including a first communication device positioned at a first point, a second communication device positioned at a second point being different from the first point, and a third communication device configured to communicate with the first communication device and the second communication device, the synchronization method comprising, by the third communication device:
 receiving synchronization information relating to the first communication device from the first communication device, and then transmitting the synchronization information relating to the first communication device to the second communication device.

(Supplementary Note 11) The synchronization method for a network system according to Supplementary Note 10, further comprising, by the second communication device:
 comparing synchronization information relating to an own device with the synchronization information relating to the first communication device being received from the third communication device, and determining whether a comparison result of the synchronization information falls within a specified range.

(Supplementary Note 12) The synchronization method for a network system according to Supplementary Note 10 or 11, further comprising, by the third communication device:
 receiving synchronization information relating to the second communication device from the second communication device, and then transmitting the synchronization information relating to the second communication device to the first communication device.

(Supplementary Note 13) The synchronization method for a network system according to Supplementary Note 12, further comprising, by the first communication device: comparing synchronization information relating to an own device with the synchronization information relating to the second communication device being received from the third communication device, and determining whether a comparison result of the synchronization information falls within a specified range.

(Supplementary Note 14) A synchronization method for a network system, wherein
  the network system according to Supplementary Note 11 or 13 further includes a network monitoring device configured to monitor the first communication device and the second communication device, and
  the network monitoring device receives a notice from any one of the first communication device and the second communication device that determines that a comparison result of the synchronization information does not fall within a specified range.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A network synchronization system comprising:
  a first communication device positioned at a first point;
  a second communication device positioned at a second point being different from the first point; and
  a third communication device comprising one or more memories storing instructions and one or more processors configured to execute the instructions to communicate with the first communication device and the second communication device, and receive synchronization information relating to the first communication device from the first communication device, and then transmit the synchronization information relating to the first communication device to the second communication device, wherein
  the second communication device comprises one or more memories storing instructions and one or more processors configured to execute the instructions to compare synchronization information relating to the second communication device with the synchronization information relating to the first communication device received from the third communication device, and determine whether a comparison result of the synchronization information falls within a specified range, and wherein
  the one or more processors in the third communication device are configured to execute the instructions to receive synchronization information relating to the second communication device from the second communication device, and then transmit the synchronization information relating to the second communication device to the first communication device.

2. The network synchronization system according to claim 1, wherein
  the first communication device comprises one or more memories storing instructions and one or more processors configured to execute the instructions to compare synchronization information relating to the first communication device with the synchronization information relating to the second communication device received from the third communication device, and determine whether a comparison result of the synchronization information falls within the specified range.

3. The network synchronization system according to claim 1, wherein
  the third communication device is a wireless terminal, and the first communication device and the second communication device are base stations that communicate with the third communication device.

4. The network synchronization system according to claim 1, wherein
  the synchronization information relating to the first communication device and the synchronization information relating to the second communication device are synchronization information provided from an identical synchronization source via different routes.

5. A network monitoring system comprising:
  the network synchronization system according to claim 1; and
  a network monitoring device comprising one or more memories storing instructions and one or more processors configured to execute the instructions to monitor the first communication device and the second communication device, and receive a notice from any one of the first communication device and the second communication device that determines that the comparison result of the synchronization information does not fall within the specified range.

6. An information terminal comprising one or more memories storing instructions and one or more processors configured to execute the instructions to:
  communicate with a first communication device positioned at a first point and a second communication device positioned at a second point being different from the first point, and receive synchronization information relating to the first communication device from the first communication device, and then transmit the synchronization information relating to the first communication device to the second communication device, or receive synchronization information relating to the second communication device from the second communication device, and then transmit the synchronization information relating to the second communication device to the first communication device;
  acquire the synchronization information relating to the first communication device and the synchronization information relating to the second communication device; and
  compare the acquired synchronization information relating to the first communication device with the acquired synchronization information relating to the second communication device, and determine whether a comparison result of the synchronization information falls within a specified range.

7. A synchronization method for a network system including a first communication device positioned at a first point, a second communication device positioned at a second point being different from the first point, and a third communication device configured to communicate with the first communication device and the second communication device, the synchronization method comprising:

by the third communication device, receiving synchronization information relating to the first communication device from the first communication device, and then transmitting the synchronization information relating to the first communication device to the second communication device;

by the second communication device, comparing synchronization information relating the second communication device with the synchronization information relating to the first communication device being received from the third communication device, and determining whether a comparison result of the synchronization information falls within a specified range; and by the third communication device, receiving synchronization information relating to the second communication device from the second communication device, and then transmitting the synchronization information relating to the second communication device to the first communication device.

8. The synchronization method for a network system according to claim 7, further comprising:

by the first communication device, comparing synchronization information relating to the first communication device with the synchronization information relating to the second communication device being received from the third communication device, and determining whether a comparison result of the synchronization information falls within the specified range.

9. The synchronization method for a network system according to claim 7, wherein the network system further includes a network monitoring device configured to monitor the first communication device and the second communication device, and the network monitoring device receives a notice from any one of the first communication device and the second communication device that determines that the comparison result of the synchronization information does not fall within the specified range.

* * * * *